United States Patent
DeWitt

(10) Patent No.: US 8,511,876 B2
(45) Date of Patent: Aug. 20, 2013

(54) ON-AXIS MONOLITHIC ELLIPSOIDAL LENS FOR OPTICAL COUPLING SYSTEMS

(75) Inventor: Frank DeWitt, Lima, NY (US)

(73) Assignee: CVI Laser, LLC, Rochester, NY (US)

(*) Notice: Subject to any disclaimer, the term of this patent is extended or adjusted under 35 U.S.C. 154(b) by 337 days.

(21) Appl. No.: 13/041,314

(22) Filed: Mar. 4, 2011

(65) Prior Publication Data
US 2012/0224386 A1  Sep. 6, 2012

(51) Int. Cl.
G02B 6/32  (2006.01)
G02B 17/08 (2006.01)

(52) U.S. Cl.
USPC ........... 362/554; 362/335; 362/327; 362/558; 362/311.06

(58) Field of Classification Search
USPC . 362/551, 554, 558, 327, 335, 311.06–311.1, 362/307–309; 359/725–727, 642
See application file for complete search history.

(56) References Cited

U.S. PATENT DOCUMENTS

| | | | | |
|---|---|---|---|---|
| 3,001,446 A * | 9/1961 | Bouwers et al. | ............. | 359/731 |
| 3,982,824 A * | 9/1976 | Rambauske | .................. | 359/859 |
| 5,042,928 A * | 8/1991 | Richards | ........................ | 359/728 |
| 5,301,249 A * | 4/1994 | Hamblen et al. | ................ | 385/31 |
| 5,473,474 A * | 12/1995 | Powell | .......................... | 359/725 |
| 5,803,575 A * | 9/1998 | Ansems et al. | ............... | 362/554 |
| 5,884,995 A * | 3/1999 | Perlo et al. | .................... | 362/327 |
| 5,930,055 A * | 7/1999 | Eisenberg | ..................... | 359/728 |
| 6,896,381 B2 * | 5/2005 | Benitez et al. | ............... | 359/858 |
| 8,408,772 B2 * | 4/2013 | Li | ................................ | 362/554 |

* cited by examiner

*Primary Examiner* — Bao Q Truong
(74) *Attorney, Agent, or Firm* — Steven R. Scott

(57) ABSTRACT

The instant invention teaches a compact collection lens with finite conjugates for use in coupling the collected energy from a broadband source into a multi-mode fiber. The lens is reflective in nature and provides finite conjugate imaging in one piece. The entrance and exit surfaces are made concentric with the object and image so that on-axis imaging is completely free of chromatic aberrations. The primary is nominally elliptical and is the only surface with optical power in the lens. The secondary is planar and serves to fold the progressing rays back in the original direction. In summary, the invention comprises a monolithic lens composed of four optical surfaces (two reflective and two transmissive) such that the primary and secondary mirrors are annular and the entrance and exit surfaces are predominantly spherical with their centers located at the front and back focal points.

15 Claims, 7 Drawing Sheets

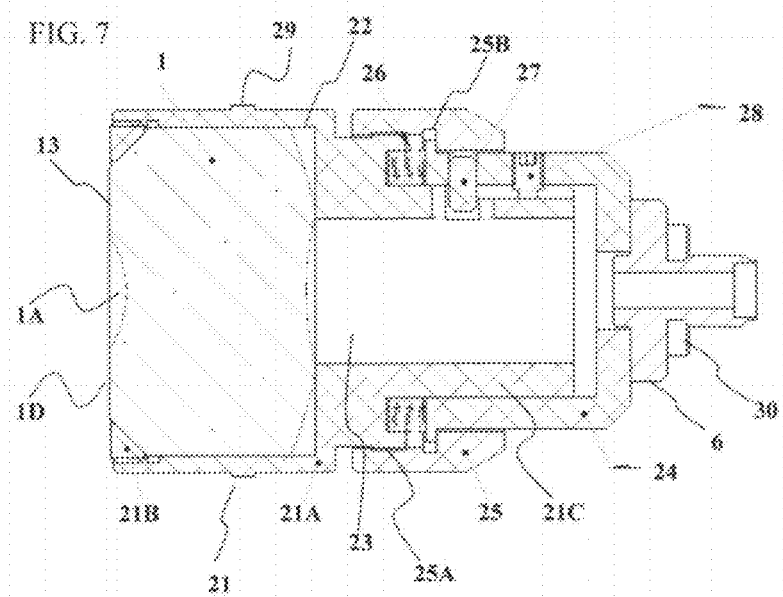
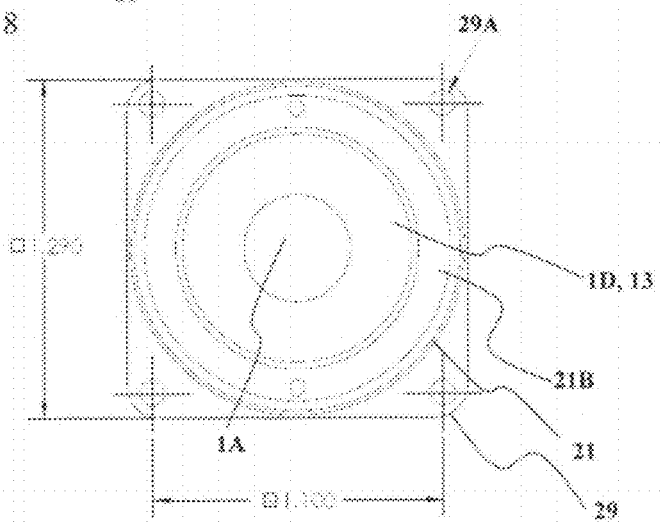

ON-AXIS MONOLITHIC ELLIPSOIDAL LENS FOR OPTICAL COUPLING SYSTEMS

BACKGROUND OF THE INVENTION

1. Field of the Invention

This invention pertains generally to a unique on-axis monolithic ellipsoidal lens and particularly to its application in and for optical coupling systems. More specifically, the invention describes a lens form adapted to function as a compact collection lens with finite conjugates to couple the collected energy from a broadband source into a multi-mode optical fiber.

2. Description of the Related Art

This invention relates generally to catadioptric systems. Catadioptric optical systems combine reflection and refraction in the same optical system, typically via lenses (dioptrics) and curved mirrors (catoptrics). Catadioptric combinations are widely used in focusing systems, including telescopic focusing systems and are often associated in this format with the pioneering work of Dmitri Dmitrievich Maksutov, the inventor of the Maksutov telescope.

Other prior art examples that are or might be related to the technology and/or purposes of the instant invention include: (1) U.S. Pat. No. 2,571,657 issued to Bennett for a "Catadioptric Lens System" (1951) and describing catadioptric systems having large relative apertures and wide angular fields; (2) U.S. Pat. No. 3,001,446 issued to Bouwers for "Optical Systems Comprising a Spherical Concave Mirror and a Meniscus Lens" (1961) and describing catadioptric systems having large relative apertures and wide angular fields; (3) U.S. Pat. No. 3,982,824 issued to Rambauske for a "Catoptric Lens Arrangement" (1976) and describing species of catoptrics lens arrangements characterized by use of a quadratic conic mirror having real or virtual focal points displaced from a lens axis: (4) U.S. Pat. No. 5,042,928 issued to Richards for a "Parallel Catadioptric Optical Element" (1991) and describing a single hybrid optical element combining reflective and refractive imaging utilizing a dual reflector outer annulus zone and a refractive inner zone to achieve a high numerical aperture: (5) U.S. Pat. No. 5,301,249 issued to Hamblen et al. for a "Catoptric Coupling for an Optical Fiber" (1994) and describing a device for coupling a laser diode emission to an optical fiber utilizing two opposed mirrors to redirect the divergent light beam of the laser diode to within the smaller numerical aperture or angle of acceptance of the optical fiber: (6) U.S. Pat. No. 5,473,474 issued to Powell for a "Panoramic Lens" (1995) and describing a panoramic imaging system having a panoramic imaging block with a concentric axis of symmetry, two refractive surfaces and two reflective surfaces: (7) U.S. Pat. No. 5,930,055 issued to Eisenberg for a "Lens Apparatus" (1999) and describing a unitary, at least partially dielectric, element having formed thereon plural electromagnetic radiation reflecting surfaces, at least one of which is a total internal reflection surface: and (8) U.S. Pat. No. 6,896,381 issued to Benitez et al. for a "Compact Folded-Optics Illumination Lens" (2005) and describing an apparatus configured to convert a first distribution of an input radiation to a second distribution of output radiation.

The foregoing art examples and/or disclosures reveal a variety of forms and systems. However, none feature the unique combination of elements and advantages offered by the instant invention.

SUMMARY OF THE INVENTION

The instant invention was developed Out of an effort to create a compact collection lens with finite conjugates to couple the collected energy from a broadband source into a multi-mode fiber. The lens is reflective in nature and provides finite conjugate imaging in one piece. The entrance and exit surfaces are made concentric with the object and image so that on-axis imaging is completely free of chromatic aberrations. The primary is nominally elliptical and is the only surface with optical power in the lens. The secondary is planar and serves to reflect the progressing rays back in the original direction. In summary, the invention comprises a monolithic lens composed of four optical surfaces (two reflective and two transmissive) such that the primary and secondary mirrors are annular and the entrance and exit surfaces are predominantly spherical with their centers located at the front and back focal points. This not only differs significantly from prior art designs and ideas, it offers numerous advantages. In terms of Maksutov forms, the on-axis monolithic ellipsoidal lens of the invention differs in that the entrance aperture and exit aperture are both through the centers of the primary and secondary mirrors (with the primary and secondary both being annular). This allows for high Numerical Apertures (NAs) on both sides of the lens without it becoming excessively large. All Maksutov forms have either the primary or the secondary internal to either the entrance or exit NA cone.

Further, the on-axis monolithic ellipsoidal lens of the invention offers numerous advantages generally over prior art in that: (a) it is one-piece: (b) it has only one surface with optical power, making the tolerances on placement of the four optical surfaces of lens of the invention relatively loose: (c) the ellipsoidal surface is a relatively weak aspheric surface and can be made through a variety of methods including magnetorheological finishing ("MRF"); and (d) the lens can be molded for mass production. Possible alternative solutions to the problems solved by the invention have numerous disadvantages. For example, a refractive lens broadly achromatized to operate in a range acceptable for the purposes of the invention (e.g., 200 nm to 800 nm) would need to have multiple elements of varied materials. Materials with suitable transmission at 200 nm are limited and include $SiO_2$, $CaF_2$, and $BaF_2$. Thus, a multi-element lens of this type would be far more expensive with tolerances that would be tighter and harder to achieve in terms of element placement. In addition, traditional Schwarzchild reflective objectives are generally infinite conjugate or have a very long back focal distance. Optimizing a form where the secondary is inside the obscuration results in a very large diameter solution when a large output NA is required. With the ellipsoidal form, the active aperture of the secondary is outside the collection NA. This results in a small diameter objective for finite conjugates. Another alternative would be an off-axis ellipse. However, this would be more cumbersome to implement given the fact that the object and image do not lie on a common axis and they suffer from off-axis aberrations. Thus, it is believed that the on-axis monolithic ellipsoidal lens of the instant invention is not only unique and nonobvious over prior art, but offers numerous advantages that cannot be realized by recourse to prior art or to any other available alternatives.

BRIEF DESCRIPTION OF THE DRAWINGS

FIG. 7 provides a cross-sectional view through A-A of the optical coupling device as illustrated in FIG. 6.

FIG. 8 provides a view of a first end of the optical coupling device of FIG. 5, which end is adapted to collect energy from a broadband source.

DESCRIPTION

Figure 1:
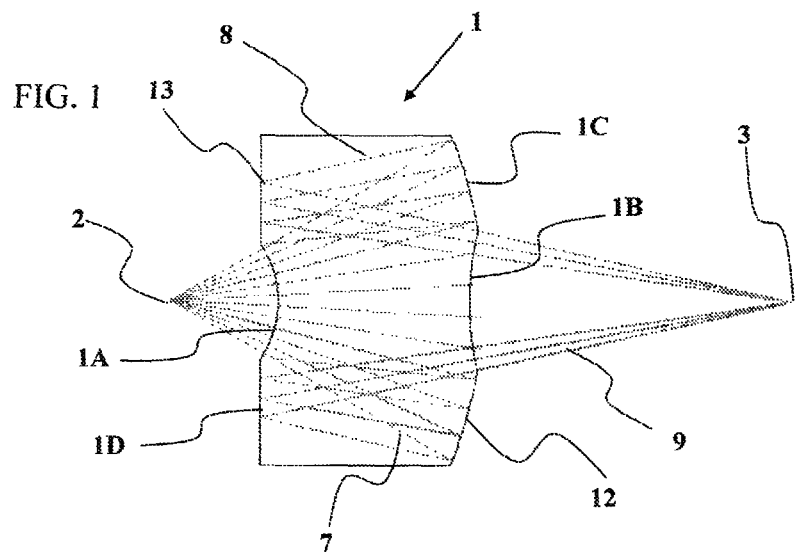
FIG. 1 provides a first schematic side view of the on-axis monolithic ellipsoidal lens of the invention, illustrating relevant light paths passing through the said lens.
Figure 2:
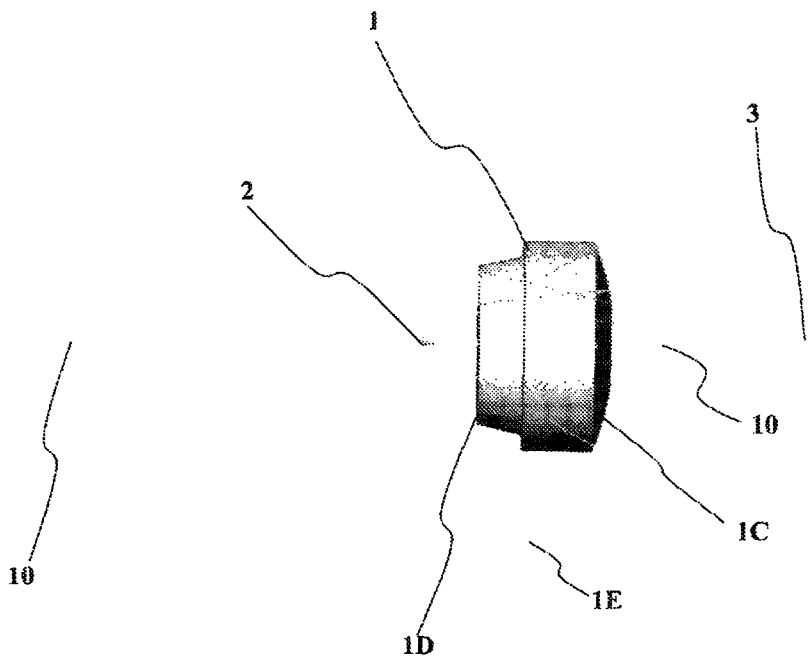
FIG. 2 provides a second schematic side view of the on-axis monolithic ellipsoidal lens of the invention, illustrating details related to a particular version thereof.
Figure 3:
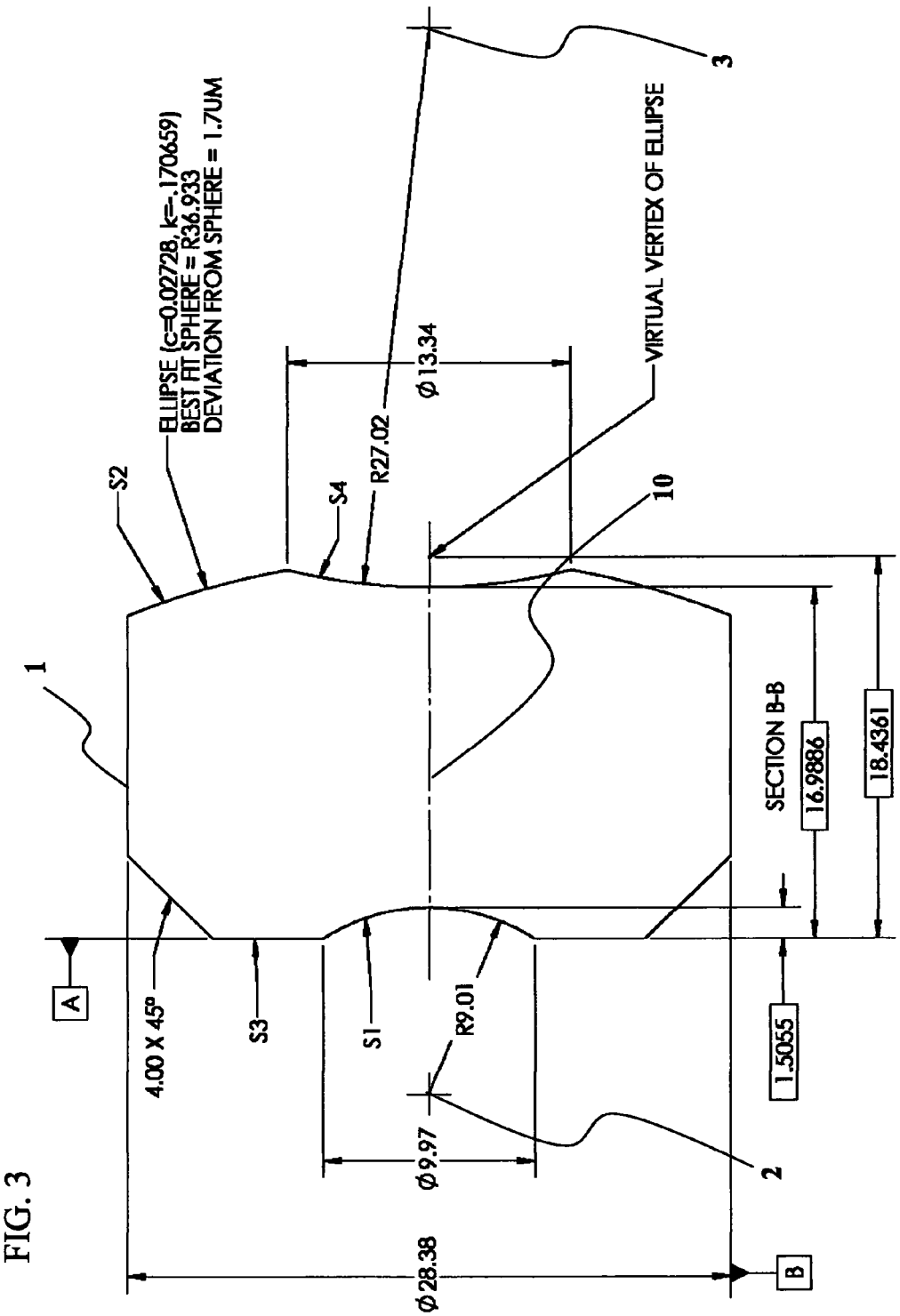
FIG. 3 provides a third schematic side view of the on-axis monolithic ellipsoidal lens of the invention, illustrating a particular implementation thereof.
Figure 4:
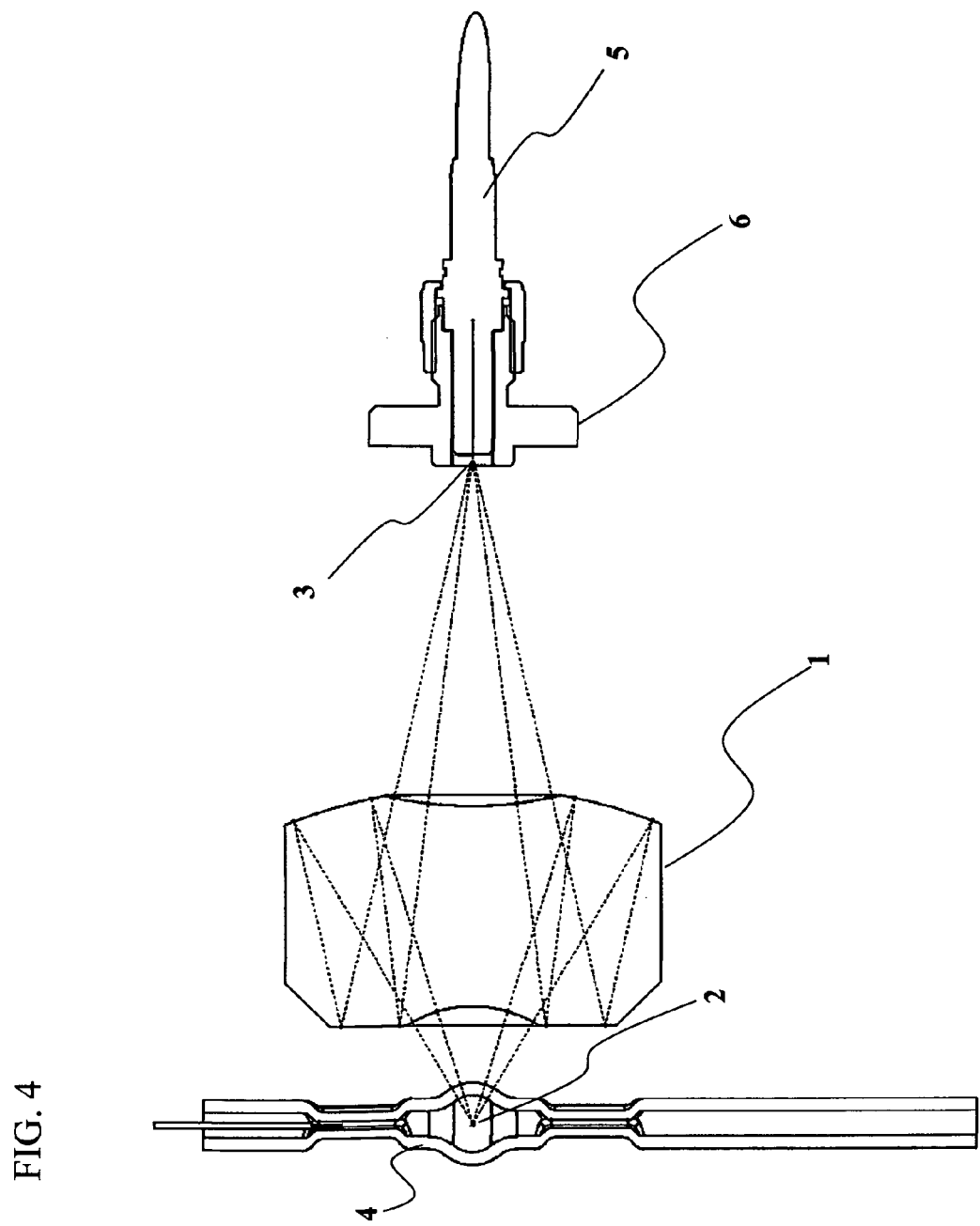
FIG. 4 provides a fourth schematic side view of the on-axis monolithic ellipsoidal lens of the invention, illustrating its application in collecting light from a broadband source and focusing it on an optical fiber.

Turning first to FIGS. 1 through 4, which provide a basic schematic introduction to the invention, it will be seen that the on-axis monolithic ellipsoidal lens of the invention, in its preferred embodiments, is formed with/as a single monolithic lens body 1 where all reflections critical to its function are internal. The surface of monolithic lens body 1 forming primary 1C forms an annular ring surrounding exit surface 1B, is nominally elliptical, and is the only surface with optical power in the on-axis monolithic ellipsoidal lens of the invention. (See, also, schematic ellipse 1E of FIG. 2). The surface of monolithic lens body 1 forming secondary 1D forms an annular ring surrounding entrance surface 1A, is planar, and serves to reflect the progressing rays back in the original direction through exit surface 1B. The reflections and light paths critical to the function of the invention occur within a solid medium (the optical glass forming monolithic lens body 1).

However, the invention cannot rely primarily on optical principles of total internal reflection (TIR) at the aforesaid reflective surfaces 1C, 1D in the preferred embodiments, as the planned angle of incidence at these surfaces does not exceed the critical angle for TIR. Instead, mirrored surface coatings 12, 13 are applied to the exterior of monolithic lens body 1 on, respectively, primary surface 1C and secondary surface 1D. Evaporated aluminum is a preferred general-purpose, metallic coating for use in the visible and near-infrared spectra. Other coatings are possible if the element is to be used outside the visible wavelengths or if higher reflectance is required over a given waveband, and could be of the metallic or dielectric type.

A further refinement in the design of the invention is illustrated in the preferred form of entrance surface 1A and exit surface 1B. The use of planar surfaces in the embodiment could result in refraction of incoming and exiting light at surfaces 1A, 1B. This refraction could possibly be calculated and compensated for and/or included in the design calculations relevant to different applications of the invention. However, it is deemed preferable to avoid this issue by providing spherical output/input surfaces such that light incident on these surfaces is normal to the surfaces and no refraction takes place. Thus, the entrance surface 1A of the monolithic lens body 1 is centered on the optical axis 10 and spherical/concentric with the object focal point 2. Likewise, the exit surface 1B is also centered on the optical axis 10 and spherical/concentric with regard to image focal point 3. In this manner, the optical system (wherein optical power is imparted solely by the non-dispersive reflective surface of primary 1C), is rendered completely free of chromatic aberrations despite the fact that the system (i.e., lens body 1) is comprised of dispersive refractive optical material.

Figure 5:
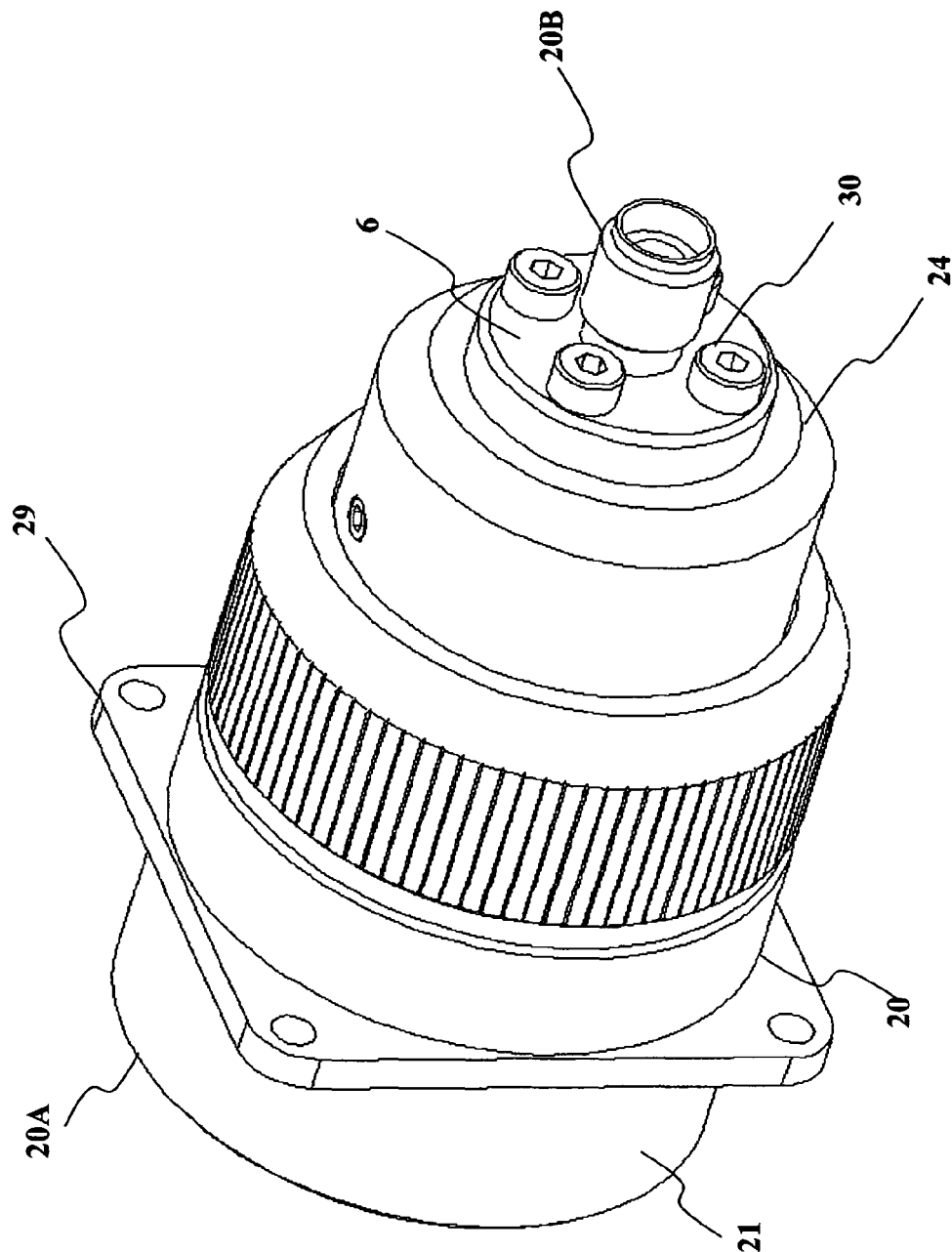
FIG. 5 provides a perspective view of an embodiment of the on-axis monolithic ellipsoidal lens implemented in and as part of an optical coupling device adapted to couple the collected energy from a broadband source into a multi-mode optical fiber.
Figure 6:
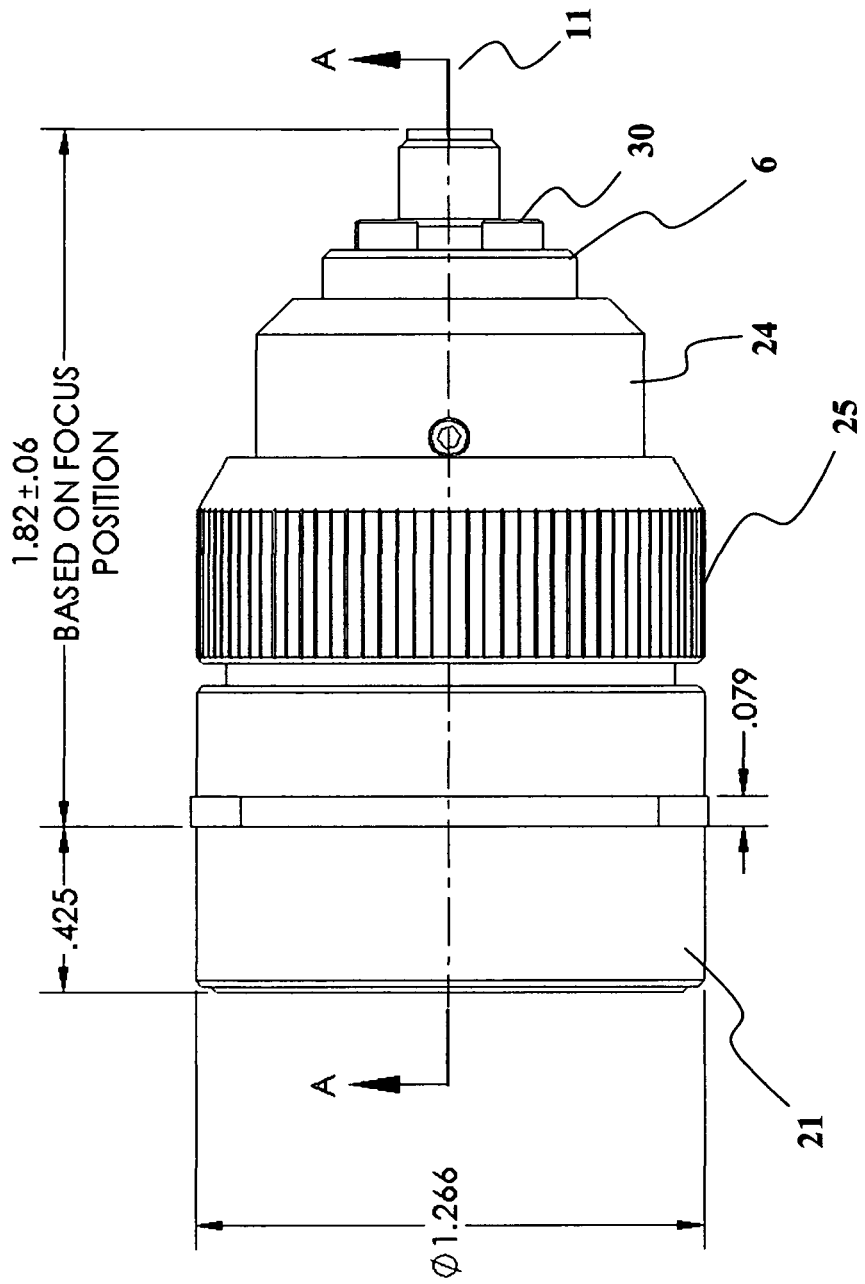
FIG. 6 provides a side view of the optical coupling device of FIG. 5.
Figure 9:
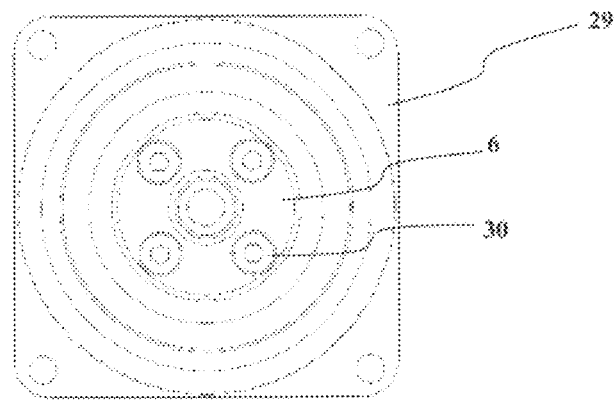
FIG. 9 provides a view a second end of the optical coupling device of FIG. 5, which end is adapted to couple to a multi-mode optical fiber.
Figure 10:
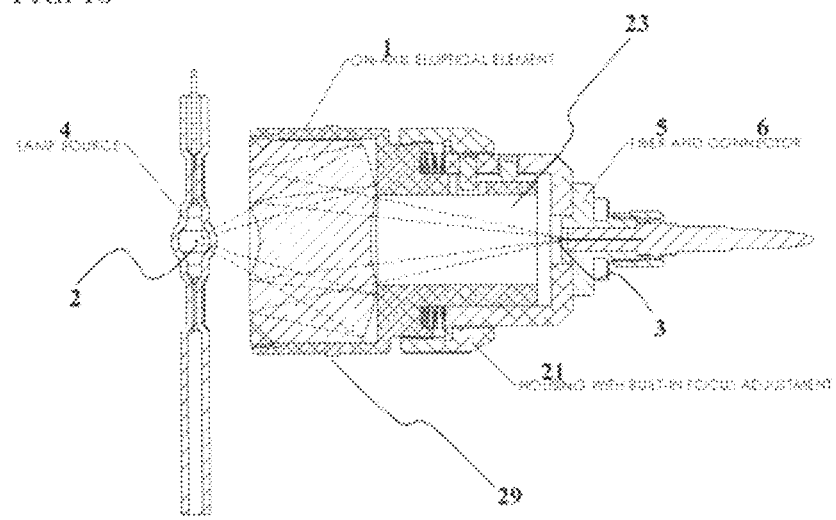
FIG. 10 provides a cross-sectional view of the optical coupling device of FIG. 5, positioned in operative relationship to a broadband light source at its first end and coupled to a multi-mode optical fiber at its second end.

Thus, schematically, it can be seen that the invention comprises a monolithic lens body 1 including four optical surfaces: two of which are transmissive—entrance surface 1A and exit surface 1B and two of which are reflective—primary 1C and secondary 1D. And, where reflective surfaces 1C, 1D are annular and surround the entrance and exit surfaces 1A, 1B, which are predominantly spherical with their centers located at the front focal point 2 and back focal point 3. The benefits of this system are more fully realized, particularly in the planned application, by the provision of a housing 20 to protect the lens body 1 of the on-axis monolithic ellipsoidal lens and to serve as an optical coupling system, assisting in holding constituent parts together in properly spaced and aligned relationship in order to suit it for use in a particular application such as, e.g., for use as a compact collection lens to couple the collected energy from a broadband source into a multi-mode optical fiber (as illustrated in FIGS. 5-10) or for some other use.

Housing 20 includes a cylindrical outer barrel member 21 with a first cylindrical portion 21A defining a cylindrical containment space 22 adjacent first end 20A of housing 20. Containment space 22 is adapted and dimensioned so as to allow lens body 1 to snugly nest therein in the manner illustrated, with its optical axis 10 aligned with a central axis 11 of barrel member 21 and surfaces 1A, 1D adjacent first end 20A. A retainer ring 21B is provided and secured at first end 20A adjacent lens body 1 so as to retain lens body 1 in containment space 22. Outer barrel 21 has a second cylindrical portion 21C defining a cylindrical focusing space 23 extending from surfaces 1B, 1C towards second end 20B. Focusing space 23 is adapted and dimensioned to allow for focus on the optic fiber 5 at image focal point 3.

However, fine control of focus can be achieved using means well known in the art. In the preferred embodiment illustrated, line focus control is achieved via the interaction of several parts of housing 20. To begin with, a cylindrical focus barrel 24 is slidably mounted to and over second cylindrical portion 21C of housing 20. The connector 6 bearing optical fiber 5 is mounted to the end of focus barrel 24 at second end 20B of housing 20. Exact positioning of the optical fiber at image focal point 3 can, therefore, be achieved by sliding movement of focus barrel 24 in relation to outer barrel 21. Fine control of this sliding movement is achieved using a threaded focus ring 25 mounted to outer barrel 21 at threaded juncture 25A, such that rotation of focus ring 25 (moving it towards or away from second end 20B) will slide focus barrel 24 relative to second end 20B via the interaction between focus barrel 24 and focus ring 25 at flange/groove 25B. Function of the system described is facilitated by the provision of a spring 26 intermediate focus barrel 24 and outer barrel 21; a dowel pin 27 arrangement limiting sliding movement: and a set screw 28 that can be tightened to affix the elements in position once fine control of focus is attained. Finally, a connection flange 29 is provided for convenient mounting of housing 20 in proper position for use.

In view of the foregoing, it should be clear that numerous changes and variations can be made without exceeding the scope of the inventive concept outlined. Accordingly, it is to be understood that the embodiment of the invention herein described is merely illustrative of the application of the principles of the invention. Reference herein to details of the illustrated embodiment is not intended to limit the scope of the claims, which themselves recite those features regarded as essential to the invention.

PARTS LIST

1 Lens body of on-axis monolithic ellipsoidal lens
1A Axially located light entry surface of on-axis monolithic ellipsoidal lens
1B Axially located exit surface of on-axis monolithic ellipsoidal lens
1C Annular primary of on-axis monolithic ellipsoidal lens
1D Annular secondary of on-axis monolithic ellipsoidal lens
1E Schematic ellipse
2 Object focal point for on-axis monolithic ellipsoidal lens
3 Image focal point for on-axis monolithic ellipsoidal lens
4 Lamp (broadband light source) positioned at object focal point
5 Multi-mode optical fiber positioned at image focal point
6 Connector for multi-mode optical fiber
7 Exemplary light path from source/object focal point to primary
8 Exemplary light path from primary to secondary
9 Exemplary light path from secondary to fiber/image focal point
10 Optical axis for system including on-axis monolithic ellipsoidal lens
11 Axis for cylindrical housing of on-axis monolithic ellipsoidal lens
12 Mirrored surface of primary of on-axis monolithic ellipsoidal lens
13 Mirrored surface of secondary of on-axis monolithic ellipsoidal lens
20 Housing for on-axis monolithic ellipsoidal lens
20A First end of housing
20B Second end of housing
21 Cylindrical outer barrel member of housing
21A First cylindrical portion of cylindrical outer barrel member
21B Retainer ring for on-axis monolithic ellipsoidal lens
21C Second cylindrical portion of cylindrical outer barrel member
22 Containment space within first cylindrical portion
23 Focusing space within second cylindrical portion
24 Focus barrel of housing
25 Focus ring for housing
25A Threaded juncture of focus ring and outer barrel
25B Flange/groove juncture of focus ring and focus barrel
26 Spring intermediate focus barrel and outer barrel
27 Dowel pin
28 Set screw
29 Connection flange for housing
29A Attachment hole in connection flange
30 Connection screws

What is claimed is:

1. An on-axis monolithic ellipsoidal lens system, comprising:
   a monolithic lens body, said lens body having an optical axis, having a first side facing an object focal point on said optical axis, and having a second side opposite said first side facing an image focal point on said optical axis;
   wherein said first side has a circular light entry surface portion symmetrically arranged around and centered on said optical axis and a light reflecting annular surface portion symmetrically arranged around said light receiving circular portion and centered on said optical axis;
   wherein said second side has a circular light exiting surface portion symmetrically arranged around and centered on said optical axis and a light reflecting annular surface portion symmetrically arranged around said light exiting circular portion and centered on said optical axis;
   wherein light from the focal point enters said lens body via said light entry surface portion, is reflected off of the light reflecting annular surface portion of the second side to the light reflecting annular surface portion of the first side without exiting from the lens body, and is reflected off of the light reflecting annular surface of the first side so as to exit the lens body via the light exiting surface portion; and
   wherein said exiting light is focused on the image focal point.

2. The on-axis monolithic ellipsoidal lens system of claim 1, wherein at least one of:
   a source of illumination is positioned at the object focal point,
   an optical fiber is positioned to receive light focused on the image focal point,
   only one reflecting surface provides optical power in the lens,
   all optical power in the lens is provided via reflection rather than refraction of the light,
   the lens provides finite conjugate imaging in one piece,
   the light entry surface portion is concentric with the object focal point,
   the light exiting surface portion is concentric with the image focal point,
   on-axis imaging for the system is completely free of chromatic aberrations,
   said light is focused on the image focal point via the light reflecting annular surface portion of the second side which acts as a primary for the system,
   the light reflecting annular surface portion of the second side acts as a primary for the system and is nominally elliptical,
   the light reflecting annular surface portion of the second side acts as a primary for the system and is the only surface with optical power in the lens,
   the light reflecting annular surface portion of the first side acts as a secondary for the system and serves to reflect the light traversing the system back in its original direction,
   the light reflecting annular surface portion of the first side acts as a secondary for the system and serves and is planar, and
   said lens system is adapted to function as a compact collection lens with finite conjugates to couple the collected energy from a broadband source located at the object focus point into a multi-mode optical fiber located at the image focal point.

3. The on-axis monolithic ellipsoidal lens system of claim 2, further comprising a housing for the lens body, which housing at least one of
   serves to hold said lens body in spaced relationship to said optical fiber,
   serves to hold said lens body in spaced relationship to said light source, and
   includes apparatus for adjusting the spaced relationship between said lens body and said optical fiber.

4. The on-axis monolithic ellipsoidal lens system of claim 1, further comprising a light reflective coating on at least one of the light reflecting annular surface portion of the first side, and the light reflecting annular surface portion of the second side.

5. The on-axis monolithic ellipsoidal lens system of claim 2, further comprising a light reflective coating on at least one of the light reflecting annular surface portion of the first side, and the light reflecting annular surface portion of the second side.

6. The on-axis monolithic ellipsoidal lens system of claim 3, further comprising a light reflective coating on at least one of the light reflecting annular surface portion of the first side, and the light reflecting annular surface portion of the second side.

7. An on-axis monolithic ellipsoidal lens system functioning as a compact collection lens coupling energy from a broadband light source into a multi-mode optical fiber, comprising:
- a monolithic lens body, said lens body having an optical axis, having a first side facing an object focal point on said optical axis, and having a second side opposite said first side facing an image focal point on said optical axis;
- a light source located at said object focal point;
- an optical fiber located at said image focal point;
- a housing for said lens body serving to hold said lens body in spaced relationship to said optical fiber and said light source;
- wherein said first side has a circular light entry surface portion symmetrically arranged around and centered on said optical axis and a light reflecting annular surface portion symmetrically arranged around said light receiving circular portion and centered on said optical axis;
- wherein said second side has a circular light exiting surface portion symmetrically arranged around and centered on said optical axis and a light reflecting annular surface portion symmetrically arranged around said light exiting circular portion and centered on said optical axis;
- wherein light from the focal point enters said lens body via said light entry surface portion, is reflected off of the light reflecting annular surface portion of the second side to the light reflecting annular surface portion of the first side without exiting from the lens body, and is reflected off of the light reflecting annular surface of the first side so as to exit the lens body via the light exiting surface portion; and
- wherein said exiting light is focused on the image focal point.

8. The on-axis monolithic ellipsoidal lens system of claim 7, wherein at least one of:
- only one reflecting surface provides optical power in the lens,
- all optical power in the lens is provided via reflection rather than refraction of the light,
- the lens provides finite conjugate imaging in one piece,
- the light entry surface portion is concentric with the object focal point,
- the light exiting surface portion is concentric with the image focal point,
- on-axis imagine for the system is completely free of chromatic aberrations,
- said light is focused on the image focal point via the light reflecting annular surface portion of the second side which acts as a primary for the system,
- the light reflecting annular surface portion of the second side acts as a primary for the system and is nominally elliptical,
- the light reflecting annular surface portion of the second side acts as a primary for the system and is the only surface with optical power in the lens,
- the light reflecting annular surface portion of the first side acts as a secondary for the system and serves to reflect the light traversing the system back in its original direction,
- the light reflecting annular surface portion of the first side acts as a secondary for the system and serves and is planar,
- said lens system is adapted to function as a compact collection lens with finite conjugates to couple the collected energy from a broadband source located at the object focus point into a multi-mode optical fiber located at the image focal point, and
- said housing includes apparatus for adjusting the spaced relationship between said lens body and said optical fiber.

9. The on-axis monolithic ellipsoidal lens system of claim 1, further comprising a light reflective coating on at least one of the light reflecting annular surface portion of the first side, and the light reflecting annular surface portion of the second side.

10. The on-axis monolithic ellipsoidal lens system of claim 2, further comprising a light reflective coating on at least one of the light reflecting annular surface portion of the first side, and the light reflecting annular surface portion of the second side.

11. The on-axis monolithic ellipsoidal lens system of claim 3, further comprising a light reflective coating on at least one of the light reflecting annular surface portion of the first side, and the light reflecting annular surface portion of the second side.

12. An on-axis monolithic ellipsoidal lens system functioning as a compact collection lens coupling energy from a broadband light source into a multi-mode optical fiber, comprising:
- a monolithic lens body, said lens body having an optical axis, having a first side facing an object focal point on said optical axis, and having a second side opposite said first side facing an image focal point on said optical axis;
- a light source located at said object focal point;
- an optical fiber located at said image focal point;
- a housing for said lens body serving to hold said lens body in spaced relationship to said optical fiber and said light source, which housing includes a cylindrical outer barrel member interfacing with a cylindrical focus barrel slidably mounted thereto, and with a rotatable focus ring interfacing with said outer barrel and said focus barrel so as to cause sliding movement of said focus barrel with respect to said outer barrel when rotated;
- wherein said first side has a circular light entry surface portion symmetrically arranged around and centered on said optical axis and a light reflecting annular surface portion symmetrically arranged around said light receiving circular portion and centered on said optical axis;
- wherein said second side has a circular light exiting surface portion symmetrically arranged around and centered on said optical axis and a light reflecting annular surface portion symmetrically arranged around said light exiting circular portion and centered on said optical axis;
- wherein light from the focal point enters said lens body via said light entry surface portion, is reflected off of the light reflecting annular surface portion of the second side to the light reflecting annular surface portion of the first side without exiting from the lens body, and is reflected off of the light reflecting annular surface of the first side so as to exit the lens body via the light exiting surface portion; and wherein said exiting light is focused on the image focal point.

13. The on-axis monolithic ellipsoidal lens system of claim 12, wherein at least one of:

only one reflecting surface provides optical power in the lens, all optical power in the lens is provided via reflection rather than refraction of the light, the lens provides finite conjugate imaging in one piece, the light entry surface portion is concentric with the object focal point, the light exiting surface portion is concentric with the image focal point, on-axis imaging for the system is completely free of chromatic aberrations, said light is focused on the image focal point via the light reflecting annular surface portion of the second side which acts as a primary for the system, the light reflecting annular surface portion of the second side acts as a primary for the system and is nominally elliptical, the light reflecting annular surface portion of the second side acts as a primary for the system and is the only surface with optical power in the lens, the light reflecting annular surface portion of the first side acts as a secondary for the system and serves to reflect the light traversing the system back in its original direction, the light reflecting annular surface portion of the first side acts as a secondary for the system and serves and is planar, said lens system is adapted to function as a compact collection lens with finite conjugates to couple the collected energy from a broadband source located at the object focus point into a multi-mode optical fiber located at the image focal point, and said cylindrical outer barrel member includes a first cylindrical portion defining a cylindrical containment space adjacent a first end of the housing, which containment space is adapted and dimensioned so as to allow the lens body to snugly nest therein, said cylindrical outer barrel member includes a second cylindrical portion defining a cylindrical focusing space extending from said second side towards a second end of the housing, which focusing space is adapted and dimensioned to allow focus of the light on the optic fiber at the image focal point, and said optical fiber is connected to said housing at its second end via connection to said focusing barrel.

14. The on-axis monolithic ellipsoidal lens system of claim 12, further comprising a light reflective coating on at least one of the light reflecting annular surface portion of the first side, and the light reflecting annular surface portion of the second side.

15. The on-axis monolithic ellipsoidal lens system of claim 13, further comprising a light reflective coating on at least one of the light reflecting annular surface portion of the first side, and the light reflecting annular surface portion of the second side.

* * * * *